United States Patent
Kellner, Jr. et al.

(10) Patent No.: US 7,660,512 B2
(45) Date of Patent: Feb. 9, 2010

(54) SYSTEMS AND METHODS FOR MANAGING FRAME RATES DURING MULTIMEDIA PLAYBACK

(75) Inventors: Charles R. Kellner, Jr., Redmond, WA (US); William R. Sanders, Stanwood, WA (US); Darren R. Davis, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 939 days.

(21) Appl. No.: 10/686,969

(22) Filed: Oct. 16, 2003

(65) Prior Publication Data

US 2005/0084237 A1 Apr. 21, 2005

(51) Int. Cl.
| | |
|---|---|
| H04N 9/79 | (2006.01) |
| H04N 5/91 | (2006.01) |
| H04N 7/00 | (2006.01) |
| H04N 7/12 | (2006.01) |
| H04N 7/16 | (2006.01) |
| H04N 7/26 | (2006.01) |
| H04N 7/173 | (2006.01) |
| H04N 11/02 | (2006.01) |
| G06F 3/00 | (2006.01) |
| G06F 13/00 | (2006.01) |
| G06F 15/173 | (2006.01) |
| G09G 5/00 | (2006.01) |
| G11B 21/08 | (2006.01) |

(52) U.S. Cl. .................. 386/68; 386/6; 386/7; 386/8; 386/33; 386/65; 386/96; 386/98; 386/111; 386/112; 345/537; 345/611; 348/461; 348/513; 348/515; 369/30.08; 369/30.09; 375/240.26; 375/240.28; 709/224; 715/723; 725/134; 725/142

(58) Field of Classification Search .................. 386/68, 386/6, 7, 8, 33, 65, 96, 98, 112, 111; 345/537, 345/611; 369/30.08, 30.09; 709/224; 725/134, 725/142; 348/515, 461, 513; 375/240.28, 375/240.26, E7.014, E7.022; 715/723
See application file for complete search history.

(56) References Cited

U.S. PATENT DOCUMENTS

| | | | | |
|---|---|---|---|---|
| 5,053,761 | A | * | 10/1991 | Webster, III. ................ 345/590 |
| 5,392,396 | A | | 2/1995 | MacInnis |
| 5,627,765 | A | * | 5/1997 | Robotham et al. .......... 708/203 |

(Continued)

OTHER PUBLICATIONS

Hojung Cha and Jaehak Oh, "Dynamic Frame Dropping for Bandwidth Control in MPEG Streaming System", Multimedia Tools and Applications, Kluwer Academic Publishers, vol. 19, pp. 155-178, 2003.

(Continued)

*Primary Examiner*—Thai Tran
*Assistant Examiner*—Syed Y Hasan
(74) *Attorney, Agent, or Firm*—Lee & Hayes, PLLC (57) ABSTRACT

Systems and methods for managing frame rates during multimedia playback are described herein. The ideal playback timing associated with video data is determined. If an actual playback timing of the video data lags the ideal playback timing, a frame rate associated with the video data is varied using a smoothing function to recover toward the ideal playback timing. An iterative frame-dropping algorithm is applied to vary the frame rate in accordance with the smoothing function. The smoothing function incorporates as a variable an average delay associated with playback of frames in the video data.

30 Claims, 6 Drawing Sheets

U.S. PATENT DOCUMENTS

| | | | |
|---|---|---|---|
| 5,635,982 A * | 6/1997 | Zhang et al. | 348/231.99 |
| 5,760,784 A | 6/1998 | Bullis et al. | |
| 6,004,243 A * | 12/1999 | Ewert | 482/8 |
| 6,016,166 A * | 1/2000 | Huang et al. | 348/515 |
| 6,034,731 A * | 3/2000 | Hurst, Jr. | 375/240.26 |
| 6,130,987 A * | 10/2000 | Tanaka | 386/96 |
| 6,219,704 B1 * | 4/2001 | Kim et al. | 709/224 |
| 6,249,319 B1 | 6/2001 | Post | |
| 6,297,852 B1 * | 10/2001 | Laksono et al. | 348/584 |
| 6,321,252 B1 | 11/2001 | Bhola et al. | |
| 6,414,960 B1 | 7/2002 | Kuhn et al. | |
| 6,466,216 B1 | 10/2002 | Gotze et al. | |
| 6,654,539 B1 * | 11/2003 | Duruoz et al. | 386/68 |
| 6,717,891 B2 * | 4/2004 | Negishi | 369/30.11 |
| 6,831,653 B2 * | 12/2004 | Kehlet et al. | 345/558 |
| 7,116,743 B1 * | 10/2006 | Wang | 375/362 |
| 2001/0033620 A1 * | 10/2001 | Itokawa | 375/240.28 |
| 2003/0210251 A1 * | 11/2003 | Brown | 345/611 |
| 2004/0268397 A1 * | 12/2004 | Dunbar et al. | 725/88 |
| 2005/0005025 A1 * | 1/2005 | Harville et al. | 709/241 |
| 2005/0013365 A1 * | 1/2005 | Mukerjee et al. | 375/240.16 |

OTHER PUBLICATIONS

Paul A. Kolers, "Motion from Continuous or Discontinuous Arrangements", ACM SIGGRAPH/SIGART Interdisciplinary Workshop, University of Tonronto, Elsevier Science Publishing Co., pp. 227-239, 1986.

* cited by examiner

SYSTEMS AND METHODS FOR MANAGING FRAME RATES DURING MULTIMEDIA PLAYBACK

TECHNICAL FIELD

The systems and methods described herein relate to multimedia playback and, more particularly, to managing frame rates of the multimedia playback.

BACKGROUND

Today's computers are versatile machines capable of performing many tasks that traditionally require many separate machines. For example, general purpose personal computers are increasingly being used for playing back multimedia data, which usually require dedicated video viewing electronics, such as VCD players, DVD players, and the like. Multimedia data are often compressed for ease of transmission and storage. Substantial processing power and memory capabilities are required to decompress and render multimedia data. These requirements for multimedia playback can be taxing even for powerful personal computers.

Multimedia playback is a familiar and desirable feature of today's small handheld computers and other portable consumer electronic devices. The design of these computers places priorities on portability and economy. These priorities often result in reductions in processing power and memory capacity. Also, many of today's portable consumer electronic devices, including handheld computers, typically lack hardware audio/video acceleration. As a result, handheld computers and other portable consumer electronic devices typically offer a small fraction of the multimedia playback capabilities possessed by a typical personal computer. Still, users are increasingly demanding and expecting their portable consumer electronic devices to playback the same multimedia data that can be handled by their more powerful personal computers.

The current trends of multimedia data are to use higher frame rates and resolution to increase the quality of the playback while using more aggressive video compression methods to maintain reasonable requirements for transmission and storage of the data. Achieving smooth playback of computationally intensive multimedia data is challenging on a computer having insufficient processing power. Conventional audio/video synchronization methods do not deal adequately with this problem. In fact, these conventional methods tend to degrade the quality of the multimedia playback by dropping frames at the most inopportune moments, such as when the viewer's full attention is attracted by quick action or scene changes.

Thus, there is a need for a system that enables multimedia playback on computers with limited processing power without substantially degrading the quality of the playback.

SUMMARY

The systems and methods described herein are directed at managing frame rates during multimedia playback. In one aspect, the systems and methods determine the ideal playback timing associated with video data. If the actual playback timing of the video data lags the ideal playback timing, the frame rates associated with the video data are smoothly varied to recover toward the ideal playback timing.

In another aspect, an average delay associated with the playback of multiple frames of the video data is computed. The frame rates are varied in accordance with a smoothing function having the average delay as a variable.

In yet another aspect, the systems and methods apply an iterative frame-dropping algorithm to determine whether a particular frame in the video data should be dropped. The iterative frame-dropping algorithm takes previous frames into account to smoothly vary the frame rate.

DETAILED DESCRIPTION

Multimedia data typically include compressed audio and video data. Multimedia playback requires both audio and video data to be decompressed. Generally, audio data compression techniques require less processing power for decompression than video data. For video data, the processing power needed for decompression typically varies with the complexity of the multimedia data. In particular, video data having images that change significantly from frame to frame, such as those involving action sequences or a scene change, require more processing power to decompress than video data with stable images. Multimedia playback on a computer with limited processing capabilities often results in delays in processing the video data relative to the ideal playback timing, such as the playback timing for the audio data. One popular method for compensating for such delays is to drop (e.g., delete) frames in the video data.

Human perception of motion is an important factor to consider in determining how frames should be dropped. In this regard, some studies have suggested that lower frame rates are interpreted by an interpolation mechanism in the brain that reconstructs smooth motion using visible frames as reference points. For example, see Badler and Tsotsos, "Motion: Representation and Perception," *Proceedings of the ACM SIGGRAPH/SIGART Interdisciplinary Workshop on Motion: Representation and Perception,* 1983.

Predictable intervals between visual frames may lead to more successful reconstruction of smooth motion by the human brain. This mechanism may be more successful when the intervals between frames are more predictable. In particular, less visual processing is needed if the frame rates vary in a smooth manner. When this happens, the viewer experiences a more relaxed feeling, which may produce the perception of smoother motion.

Thus, the systems and methods discussed herein provide for managing frame rates during multimedia playback. These systems and methods manage frame rates differently from the ways in which convention systems manage frame rates. For example, many conventional systems abruptly drop frames in a video stream when there is a significant delay in processing video data. These systems tend to cause abruptly changing frame rates and choppy images, resulting in a poor viewing experience.

In contrast, the described systems and methods implement a frame-dropping mechanism that controls the frame rates in accordance with a smoothing function. This smoothing function may include the video processing delay as a variable. Smoothly varying the frame rates results in more predictable intervals between frames and, thus, enhances the viewer's experience. Controlling the frame rates in this manner also improves the viewer's experience when the frame rates are low. Specifically, the perception of audio/video synchronization is necessarily more approximate as the interval between frames becomes longer. The synchronization delay is less apparent when it is a smoothing function of the actual displayed frame interval.

Figure 1:
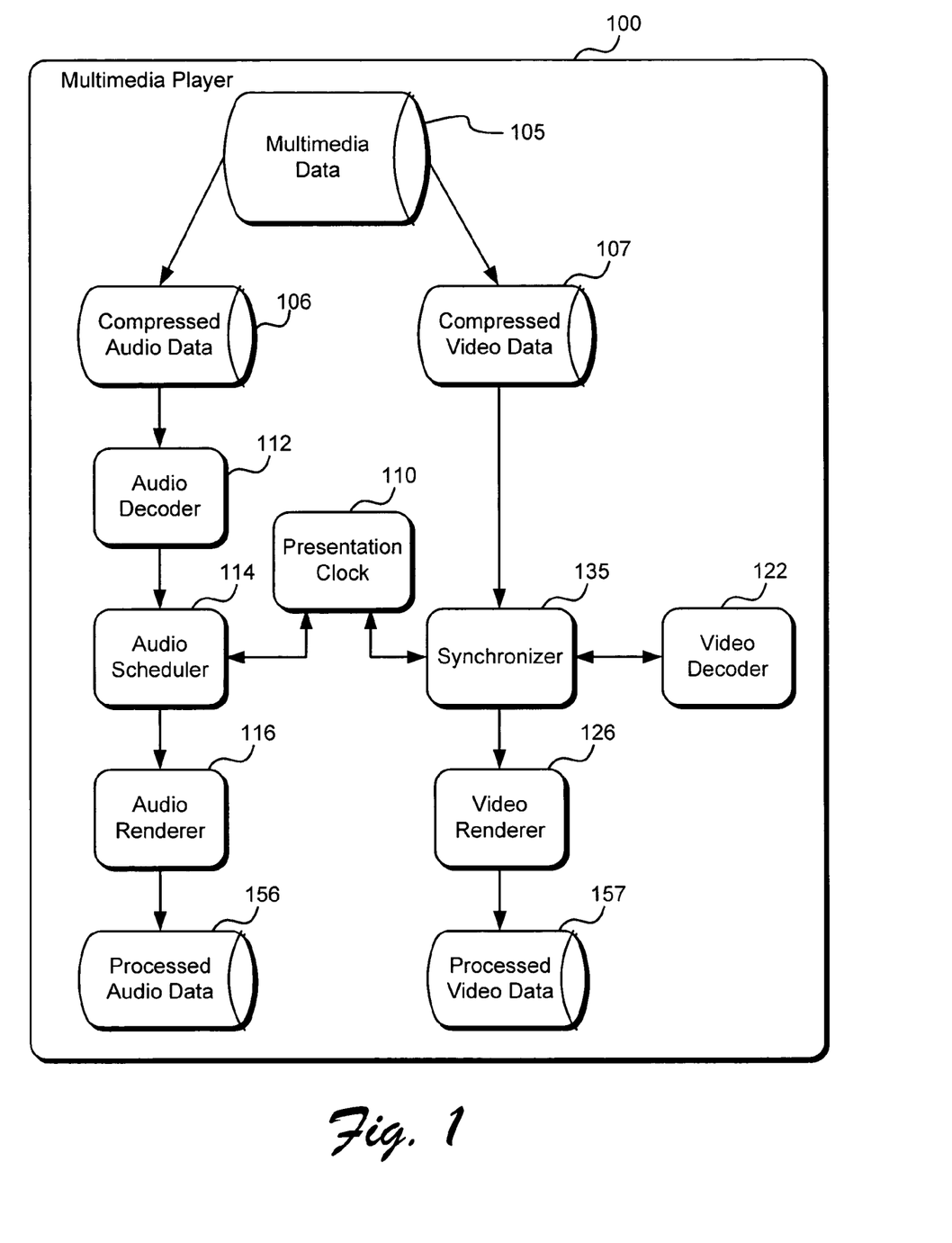
FIG. 1 is a graphical representation of an example multimedia player.

FIG. 1 is a graphical representation of an example multimedia player 100. Multimedia player 100 is a computer-executable component configured to process and display multimedia data 105. Generally, multimedia data 105 is compressed to reduce storage and facilitate transmission. Multimedia data 105 may include many types of data, such as compressed audio data 106, compressed video data 107, and the like. For purposes of discussion, multimedia data 105 is illustrated to include both compressed audio data 106 and compressed video data 107.

Multimedia player 100 may access multimedia data 105 by accessing a computer-readable media where the data are stored. Such computer-readable media may include hard drives, DVDs, memory, and the like. Multimedia data 105 may also be streamed over a network, such as the Internet, and be accessible by multimedia player 100 in real time. Multimedia player 100 is configured to parse multimedia data 105 into compressed audio data 106 and compressed video data 107 and to process them to obtain processed audio data 156 and processed video data 157. Multimedia player 100 is also configured to interact with other components in a computer to playback processed audio data 156 and processed video data 157 to a viewer.

Multimedia player 100 may include many logical components. For ease of discussion, multimedia player 100 is illustrated in FIG. 1 to include presentation clock 110, audio decoder 112, audio scheduler 114, audio renderer 116, video decoder 122, video renderer 126, and Synchronizer 135. In practice, multimedia player 100 may include more or less logical components than those shown in FIG. 1.

Audio decoder 112 is configured to decode compressed audio data 106 and associated information as part of the audio data stream. Audio decoder 112 is typically configured to handle various types of audio data format. Audio decoder 112 may use one or more types of audio compressor/decompressor (CODEC) to process compressed audio data 106. Typically the audio data stream also includes information about the ideal playback timing of the audio data.

Presentation clock 110 is a reference clock for managing the playback timing of multimedia data presentation. Presentation clock 110 may obtain playback timing information from a system timer, and/or other timing sources. Audio scheduler 114 is configured to manage the playback timing of audio data. Audio scheduler 114 may interact with presentation clock 110 to obtain the ideal multimedia presentation timing and to schedule the playback of the audio data in accordance with the ideal audio playback timing. Audio scheduler 114 may also interact with presentation clock 110 to provide synchronization feedback to guarantee that the presentation clock and audio hardware maintain consistency. Audio renderer 116 is configured to create processed audio data 156, which is in a format that is usable by other audio related components in a computer. Audio renderer 116 may be configured to interact with the other software and hardware components to facilitate the playback of processed audio data 156 to users.

Video decoder 122 is configured to decode compressed video data 107 and associated information that may be part of the video stream. Video decoder 122 may use one or more video CODEC's to process compressed video data 107. Processing of video data will be discussed in more detail below. Briefly stated, video decoder 122 is configured to construct sequential frames of video from compressed video data 107. In particular, video decoder 122 is configured to handle compressed video data that require the construction of a frame using information from a previous frame. In one embodiment, the video decoder 122 is configured to process a current frame to obtain just enough information for constructing the next frame, without actually constructing the current frame. Processing the current frame in this manner enables the current frame to be dropped without detrimentally affecting the processing of subsequent frames. In addition to video frames, video decoder typically decodes information about the ideal presentation time for video frames from the video data stream.

Video renderer 126 is configured to create processed video data 157, which is in a format that is usable by other video related components in a computer. Video renderer 126 is typically configured to interact with the other software and hardware components to facilitate the playback of processed video data 157.

Synchronizer 135 is a computer-executable component configured to control the frame rates for multimedia playback. In particular, Synchronizer 135 is configured to determine the preferred playback timing for frames of video. In one embodiment, Synchronizer 135 is configured to interact with presentation clock 110 to obtain the multimedia presentation playback timing and uses that timing to schedule the playback for the frames. Synchronization of audio and video presentation is guaranteed by each data stream using a common presentation clock as the reference timer. In many cases the presentation clock is synchronized to the audio playback hardware. However, it is to be understood that presentation clock 110 may determine the playback timing in other ways, especially for multimedia data that do not have an audio component. For example, presentation clock 110 may obtain the ideal playback timing by determining such information directly from the system timer.

Synchronizer 135 may apply additional control to the frame rates in order to optimize video presentation in relation to presentation clock 110 to yield the preferred frame rate. Since Synchronizer 135 may be tightly coupled to the presentation clock 110 to determine video playback timing in an unconstrained environment, variability in presentation clock 110 may yield similar variability in the resulting preferred frame rate as determined by Synchronizer 135. Presentation clock 110 may include a filter configured to remove variability or noise to improve the performance of Synchronizer 135.

Synchronizer 135 is configured to interact with video decoder 122 and video renderer 126. Specifically, Synchronizer 135 is configured to obtain from video decoder 122 data associated with the processing of compressed video data 107 and from video renderer 126 data associated with the rendering of processed video data 157. Synchronizer 135 may also be configured to control how each frame is processed by video decoder 122, which enables Synchronizer 135 to drop frames when appropriate.

From the data obtained from video decoder 122 and video renderer 126, Synchronizer 135 is configured to determine whether the actual playback timing associated with multimedia data 105 lags the ideal playback timing. Specifically, Synchronizer 135 calculates a delay time associated with the playback of multimedia data 105. Synchronizer 135 then applies a function to determine whether a particular frame should be dropped. This function is a smoothing function of the delay. Thus, even if frames are dropped during the playback of multimedia data 105, the frame rates of the video vary smoothly with the delay.

In one embodiment, the delay (Delay) is calculated by formula 1 below:

$$Delay = DecodeTime - PresentationTime \quad (1)$$

where "PresentationTime" is the ideal playback time of a current video frame and "DecodeTime" is the actual completion time of the decoding process associated with the current frame.

A running average of Delay (AvgDelay) may be calculated by formula 2 below:

$$AvgDelay = (Delay + (AvgDelay*(Aperture-1)))/Aperture \quad (2)$$

where the Aperture is a parameter associated with the smoothness of the frame rate variation and represents the number of frames that are used for averaging. In one embodiment, an Aperture of 6 frames generally yields good results. This running average is used to control a frame-dropping algorithm that includes a rasterization algorithm. Briefly stated, rasterization involves one whole number being added to another and compared to a third. Overflow causes the third number to be subtracted and triggers a secondary behavior. Bresenham iterative line drawing algorithm is an example of a rasterization algorithm. One embodiment of such a frame-dropping algorithm is illustrated by the following:

```
FrameSkipFactor = (AvgDelay / 4) + IdealFrameRate - TolFactor;
if (FrameSkipFactor > IdealFrameRate)
{
    Iterator += IdealFrameRate;
    if (Iterator >= FrameSkipFactor)
        Iterator -= FrameSkipFactor;
    else
        (drop this frame)
}
``` where the FrameSkipFactor is a parameter for determining whether a frame is to be dropped. The IdealFrameRate is a parameter associated with the ideal frame rate (e.g. number of milliseconds per frame) for the multimedia data. The TolFactor is a tolerance factor to allow for expected variability in the system timer. In one embodiment, a TolFactor of 20 milliseconds is representative of an exemplary system in accordance with this embodiment. The Iterator is a parameter for comparing with the FrameSkipFactor to determine whether to drop a particular frame. The Iterator value is continuously maintained for analyzing each frame in the compressed video data 107.

As shown in the frame-dropping algorithm above, the FrameSkipFactor is calculated for a frame as a fraction of the Delay plus the IdealFrameRate minus the TolFactor. If the FrameSkipFactor is greater than the IdealFrameRate, it means that the video decoder is unable to keep up with the ideal playback timing of the multimedia data and the frame may have to be dropped. In this case, the IdealFrameRate is added to the Iterator, and the result is compared to the FrameSkipFactor. Overflow is normal and expected, and means that the frame should be shown. When the Iterator is less than the FrameSkipFactor, the frame is dropped. This algorithm evenly distributes dropped frames.

Multimedia player 100 may be configured to improve the performance of Synchronizer 135 by buffering video data. In one embodiment, rendered video frames may be stored in a buffer so that Synchronizer 135 is operating ahead of real time. Buffering enables Synchronizer 135 to maintain consistent performance even if Synchronizer 135 is lagging according to its internal clock. The lag would push Synchronizer 135 closer to real time instead of falling behind it.

Figure 2A:
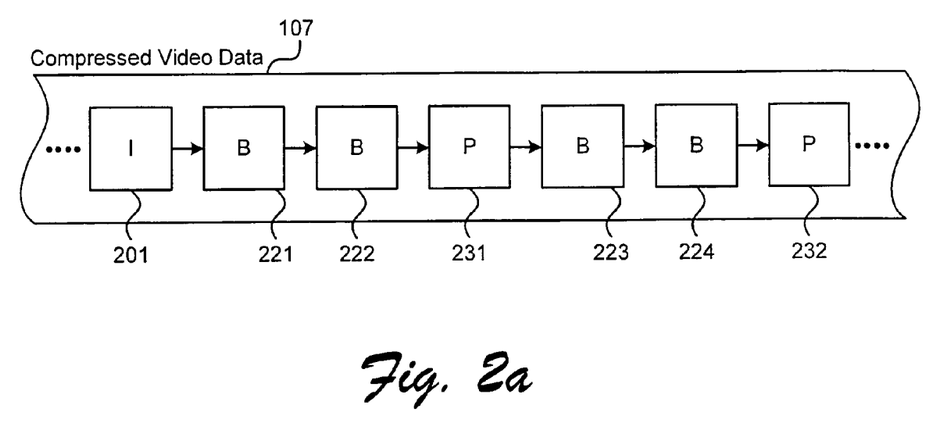
FIG. 2a is a graphical representation of a portion of compressed video data.
Figure 2B:
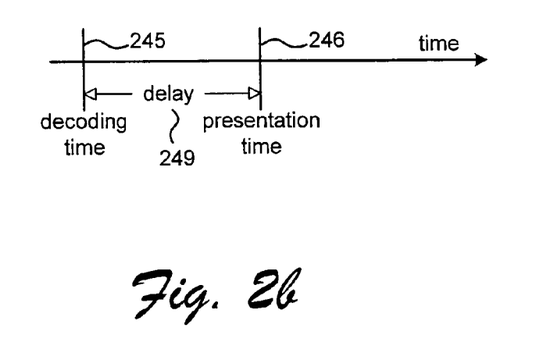
FIG. 2b is a graphical representation of a processing timeline associated with a P-frame in compressed video data.

FIG. 2a is a graphical representation of a portion of compressed video data 107. FIG. 2b is a graphical representation of a processing timeline associated with a P-frame 221 in compressed video data 107. As shown in FIG. 2a, compressed video data 107 may include intra-coded frame (I-frame) 201, predicted frames (P-frames) 231-232 and bidirectional frames (B-frames) 221-224.

I-frame 201 is a frame that is compressed without reference to any other frame in compressed video data 107. This allows the video data to be played from random positions and for fast forward/reverse. Generally, a multimedia player must start decoding from an I-frame in a sequence of frames. The frequency of I-frames is generally set when the multimedia stream is compressed or is determined by the encoding application in order to balance trade offs between number of bits required and complexity of the decoding operation. I-frames are generally encoded at a frequency of 1 every 4 to 8 seconds.

Each of the P-frames 231-232 is a frame that is coded as differences from the last I-frame or P-frame. The new P-frame is decoded by taking the last I-frame or P-frame and calculating the values of each new pixel in the new P-frame. A P-frame typically yields a compression ratio better than an I-frame and requires more processing power to decompress than the I-frame. Since the amount of compression depends on the amount of motion present in the P-frame, the processing power required for decompressing a P-frame depends on the complexity of the frame.

Each of the B-frames 221-224 is a frame that is coded as differences from the last or next I-frame or P-frame. B-frames require both previous and subsequent frames for correct decoding and typically give improved compression compared with P-frames. However, B-frames generally require more processing power to decode.

In FIG. 2b, a video decoder is currently processing P-frame 231 in compressed video data 107 at decoding time 245. However, multimedia data 107 is actually required to be rendered at presentation time 246. Thus, a delay 249 is present and frames in compressed video data 107 may have to be dropped in accordance with the frame-dropping algorithm discussed above in conjunction with FIG. 1.

In one embodiment, Synchronizer 135 is configured to drop B-frames whenever a delay is present. Synchronizer 135 may also be configured to drop B-frames if it determines that there would be significant time savings over dropping the next I-frame or P-frame. In this event, the next frame is shown, even though it was scheduled to be dropped. Thus, B-frames 221-222 may be dropped to compensate for delay 249.

Next, P-frames may be dropped in accordance with the frame-dropping algorithm. For illustrative purposes, suppose that Synchronizer 135 determines that P-frame 231 is to be dropped. In one embodiment, to maintain the integrity of compressed video data 107, Synchronizer 135 may be configured to drop all of the P-frames and B-frames following P-frame 231 up to the next I-frame. In another embodiment, Synchronizer 135 may be configured to process P-frame 231 to obtain enough information to process P-frame 232.

As discussed above, Synchronizer 135 may use a frame-dropping algorithm that is averaged over time. Under some conditions, it is possible to catch up faster than the presentation time 246 intended for the compressed video data. In this case, the decision to drop the frame in accordance with the frame-dropping algorithm may be overridden. In another embodiment, exceptions are made to force the display of the next frame whenever the algorithm determines to skip beyond the next I-frame. In yet another embodiment, exceptions are made to force the next frame whenever there actually is no new frame after the current frame. This ensures that the last frame of video data will be shown, even if the frame-dropping algorithm determined otherwise.

Figure 3:
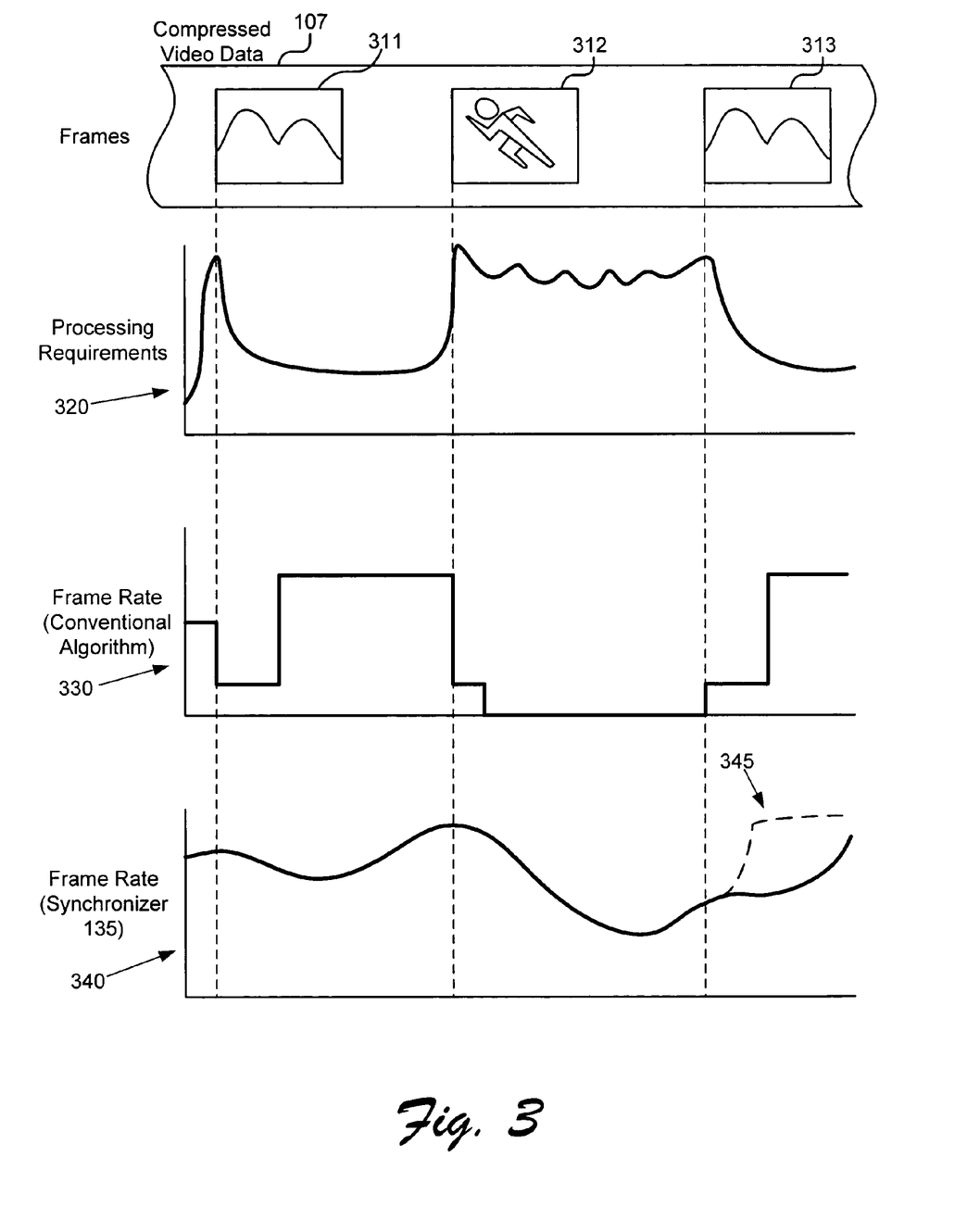
FIG. 3 shows some exemplary graphs associated with the processing and rendering of compressed video data.

FIG. 3 shows some exemplary graphs associated with the processing and rendering of compressed video data. Three exemplary frames 311-313 of a portion of compressed video data 107 are shown for illustrative purposes. Frame 311 and frame 313 are the first frames of a sequence of frames that contain stable images, such as a landscape scene. Frame 312 is the first frame of a complex sequence of frames containing many rapidly changing images, such as an action scene.

Graph 320 illustrates the processing requirements associated with the processing and rendering of compressed video data 107. The processing requirements may include a variety of relevant parameters such as processor usage, memory usage, and the like. As shown in the figure, the processing requirements for processing frame 311 are substantial due to a scene change. Because the frame sequence associated with frame 311 contains stable images, the processing requirements for processing the subsequent frames in the frame sequence are comparatively lower. The processing requirements increase again when frame 312 are processed. However, because the frame sequence associated with frame 312 contains images that change substantially from frame-to-frame, the processing requirements for processing the subsequent frames remain at a higher level throughout the frame sequence. After processing frame 313, the processing requirements become comparatively low again because of the stable images in the frame sequence associated with frame 313.

Graph 330 shows the typical frame rates that can be attained using a conventional video processing algorithm. Generally, frame rates are limited by the processing power available in the system. Specifically, if the processing requirements for processing compressed video data 107 exceed the available processing power in the system, a delay would result. To compensate, frames associated with the video data would have to be dropped to realize the preferred playback timing of the video data, resulting in frame rates that are lower than the ideal frame rates associated with the video data. For purposes of discussion, the system associated with FIG. 3 does not have sufficient processing power to realize the ideal frame rates.

As shown in graphs 320 and 330, processing frame 311 results in an increase in processing requirements (graph 320) and a corresponding decrease in frame rates (graph 330). Because the conventional video processing algorithm associated with graph 330 is configured to abruptly drop frames when there is a significant delay, the frame rates attained by that algorithm also abruptly vary as a step function. The abruptly varying frame rates result in choppy images and severely degrade the viewer's experience. To make matter worse, the conventional video processing algorithm is not configured to recover from a severe delay, such as the delay resulting from processing the video sequence associated with frame 312. As shown in FIG. 3, the conventional video processing algorithm (graph 330) simply allows the frame rates to drop to zero, which is detrimental to the viewer's enjoyment.

In contrast, the frame dropping algorithm employed by Synchronizer 135 of the present invention varies the frame rates in accordance with a smoothing function. As shown in graph 340, Synchronizer 135 allows the frame rates to smoothly drop as a result of processing frame 311. The frame dropping algorithm of Synchronizer 135 enables the frame rates to smoothly recover for the remaining frames of the sequence. Significantly, the frame dropping algorithm enables Synchronizer 135 to maintain the frame rates above zero. Thus, frames in the sequence associated with frame 312 are still shown to the viewer with smoothly decreasing frame rates, which is an improvement in viewer's experience compared to a zero frame rate.

After processing the frame sequence associated with frame 312, Synchronizer 135 enables the frame rates to smoothly increase to higher values. Since the frame rates are increasing, it may be advantageous for the frames rate to rapidly jump to the highest value available. In one embodiment, Synchronizer 135 may be configured to achieve this by enabling an abrupt frame rate increase as indicated by the aggressive frame rate curve 345 shown as a dash line.

Figure 4:
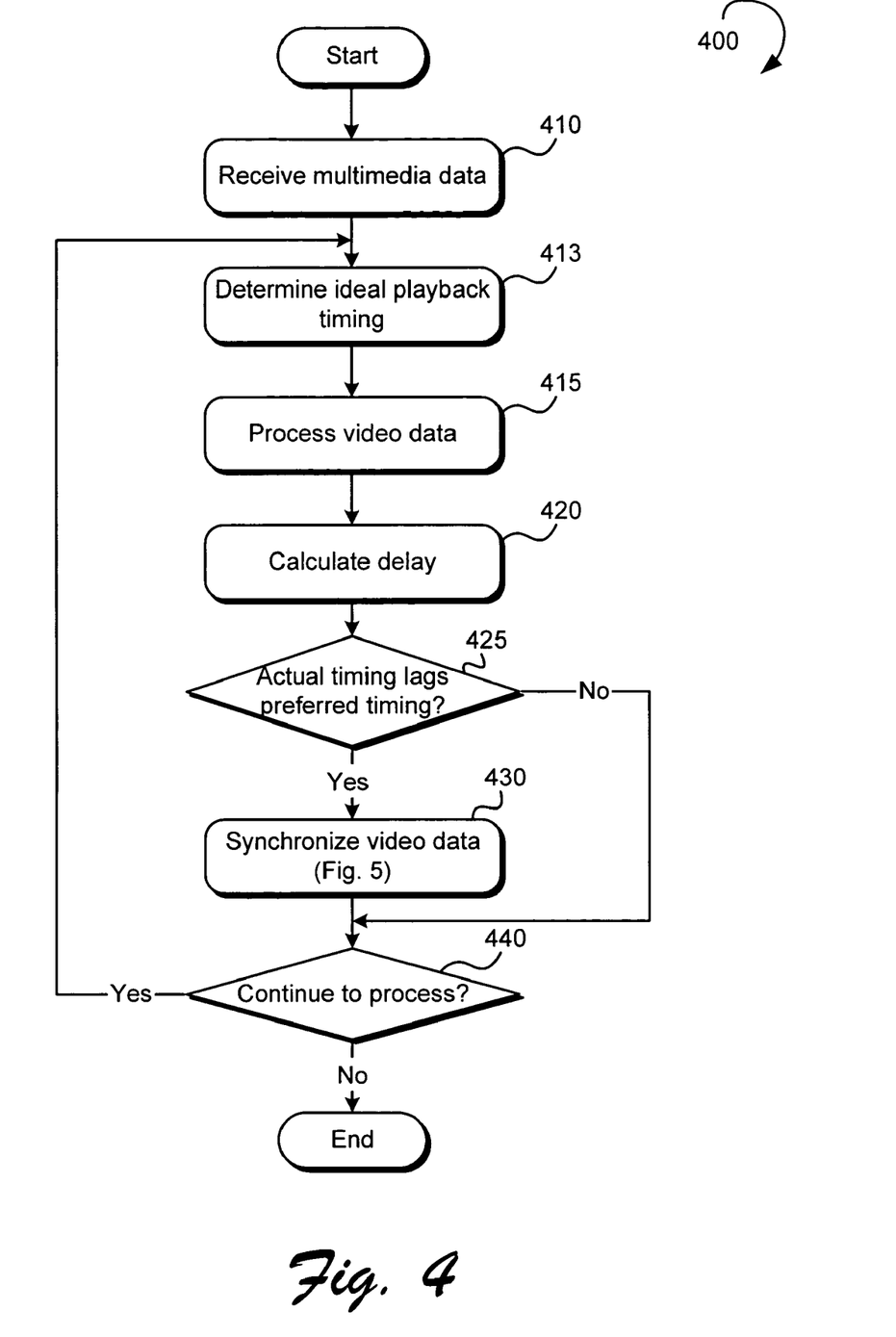
FIG. 4 is an operational flow diagram of an example process for processing multimedia data.

FIG. 4 is an operational flow diagram of an exemplary process 400 for processing multimedia data. Process 400 may be employed by a multimedia player to handle multimedia data. Moving from a start block, the process goes to block 410 where multimedia data is received. The multimedia data may include a video component but may also include other components, such as an audio component.

At block 413, the ideal playback timing of the video data is determined. The information about the ideal playback timing is typically encoded in the multimedia data.

At block 415, the video data are processed, which may include operations associated with decompression and rendering. The video data are typically processed one frame at a time. At block 420, a delay is calculated. Typically, if a system does not have sufficient processing resources, the video data cannot be processed fast enough to keep pace with the ideal playback timing of the video data and a delay will occur. Such delay often occurs when complex multimedia data are played on a device with limited processing power, such as a mobile computing device.

At decision block 425, a determination is made whether the actual playback timing of the video data lags the ideal playback timing. The delay calculated at block 420 may be used to make this determination. Typically, the actual playback timing lags the ideal playback timing if the delay exceeded a threshold value. The threshold value may take ordinary system variations into account. In one embodiment, the average delays from several frames are used to make the determination at decision block 425. If the actual playback timing does not lag the ideal playback timing, process 400 continues at decision block 440. If the actual playback timing lags the ideal playback timing, the process moves to block 430.

At block 430, the video data is synchronized where the actual playback timing is allowed to catch up with the ideal playback timing. An exemplary process for synchronizing video data will be discussed in more detail in conjunction with FIG. 5. Briefly stated, a frame-dropping algorithm is used to determine whether a particular frame should be dropped to recover from the delay. The frame-dropping algorithm is designed to drop frames in such a way that the frame rates are smoothly varied.

At block 440, a determination is made whether to continue processing video data. If so, process 400 returns to block 413 where the next frame is processed. In one embodiment, a time delta to the next time that process 400 needs to be executed is associated with the transition from block 440 to block 413. This delta is used by the controlling process to guarantee that process 400 receives priority execution when it has requested service. This has the effect of guaranteeing a more timely execution of process 400 and further improves the quality of the preferred video playback rate. When the processing is finished, process 400 ends.

Figure 5:
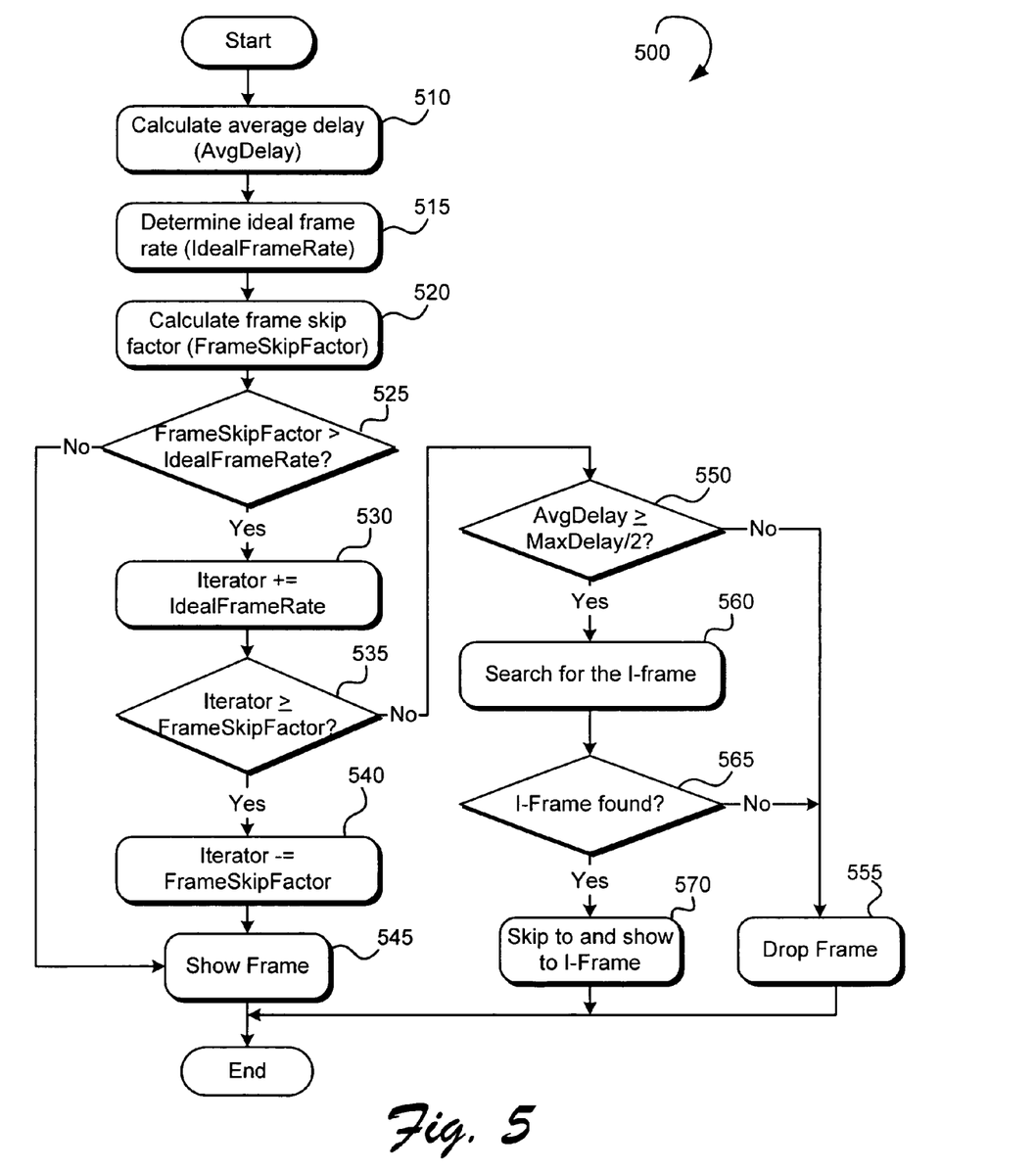
FIG. 5 is an operational flow diagram of an exemplary process for synchronizing video data.

FIG. 5 is an operational flow diagram of an example process 500 for synchronizing video data. Process 500 may be applied to determine whether a particular frame should be dropped. Moving from a start block, process 500 goes to block 510 where the average delay (AvgDelay) associated with a current frame is determined. AvgDelay is calculated by averaging the delays associated with one or more previous frames. AvgDelay enables the frame rates to smoothly vary.

At block 515, the ideal frame rate (IdealFrameRate) associated with the current frame is determined. At block 520, a frame skip factor (FrameSkipFactor) is determined. The FrameSkipFactor may be determined by taking into account AvgDelay, IdealFrameRate, system tolerance, and other relevant parameters.

At decision block 525, a determination is made whether FrameSkipFactor is greater than IdealFrameRate. If not, process 500 moves to block 545 where the current frame is shown. Process 500 then ends.

Returning to decision block 525, if FrameSkipFactor is greater than IdealFrameRate, the current frame may have to be dropped. At block 530, IdealFrameRate is added to an iterating parameter (Iterator). Iterator enables process 500 to take the disposal of prior frames into account in determining whether the current frame should be dropped.

At decision block 535, a determination is made whether Iterator is greater than or equal to FrameSkipFactor. If Iterator is greater than or equal to FrameSkipFactor, the current frame does not have to be dropped. The process continues at block 540 where FrameSkipFactor is subtracted from Iterator. At block 545, the current frame is shown and process 500 ends.

Returning to decision block 535, if Iterator is not greater than or equal to FrameSkipFactor, the current frame has to be dropped and the process continues at decision block 550.

At decision block 550, a determination is made whether AvgDelay has reached a significant percentage of (e.g. greater than half of) the maximum delay permitted in the system (MaxDelay). MaxDelay is a delay that is large enough to cause an unacceptably low frame rate. Typically, a 300-millisecond delay is unacceptable and may be used as the MaxDelay. If AvgDelay is not greater than half of MaxDelay, process 500 continues at block 555 where the current frame is dropped and the process ends.

Returning to decision block 550, if AvgDelay has exceeded half of MaxDelay, a more aggressive frame dropping algorithm is employed. At block 560, the input queue is searched for an I-frame that is ready to be rendered. At decision block 565, a determination is made whether an I-frame has been found. If so, the I-frame is shown at block 570. If no I-frame is ready to be rendered, the process continues at block 555 where the current frame is dropped. Process 500 then ends.

Figure 6:
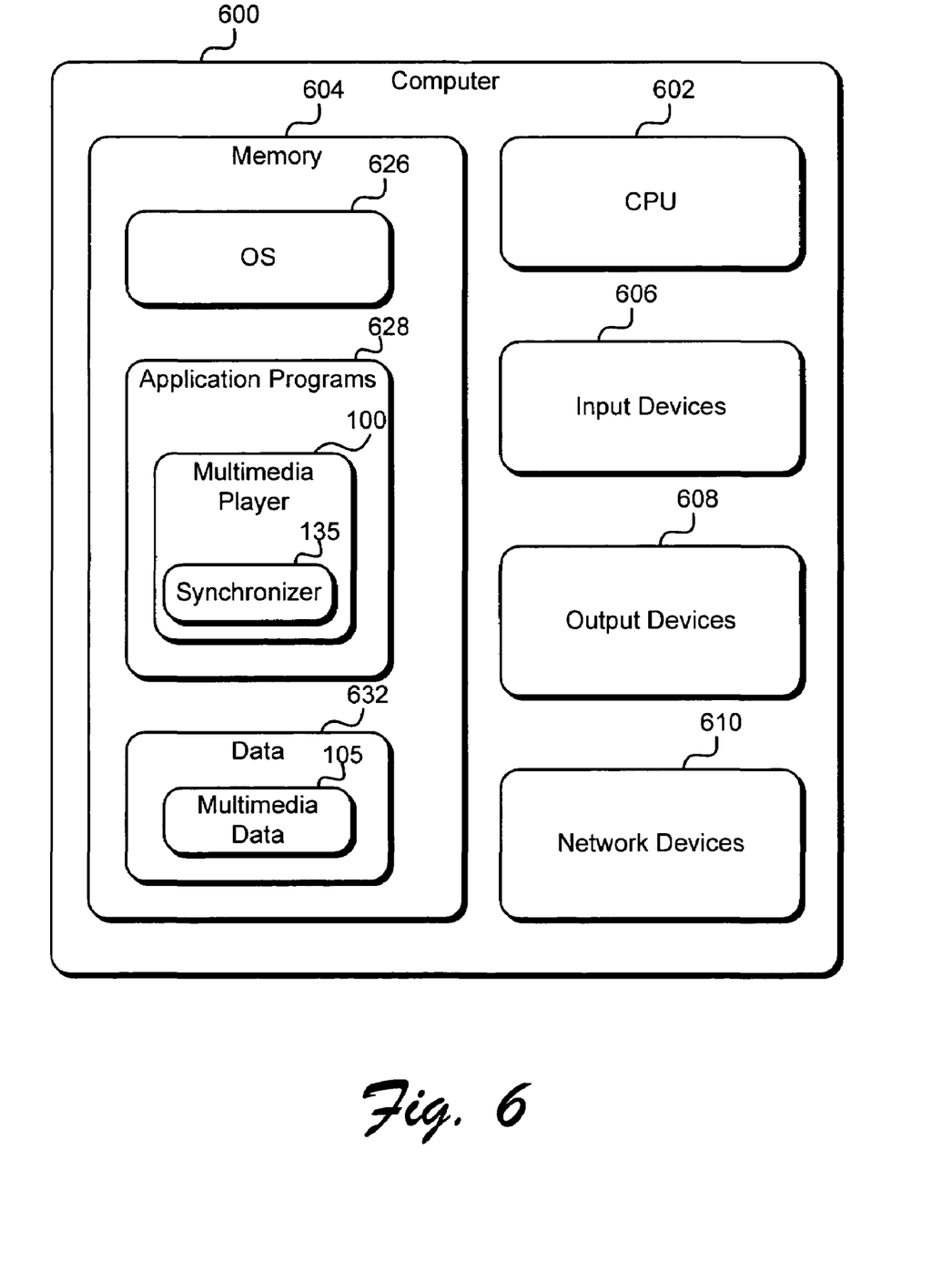
FIG. 6 illustrates an exemplary computer within which the systems and methods for managing frame rates during multimedia playback can be either fully or partially implemented.

FIG. 6 illustrates an example of an exemplary computer 600 within which the systems and methods for managing frame rates during multimedia playback can be either fully or partially implemented. Exemplary computer 600 is only one example of a computing system and is not intended to suggest any limitation as to the scope of the use or functionality of the invention. Neither should the computer 600 be interpreted as having any dependency or requirement relating to any one or combination of components illustrated in the exemplary computer 600. It is to be understood that the systems and methods described above may be implemented in many types of electronic device, including electronic devices that do not have general computing capabilities.

Computer 600 can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable or special purpose consumer electronics, network PCs, minicomputers, mainframe computers, gaming consoles, distributed computing environments that include any of the above systems or devices, and the like.

The components of computer 600 can include, but are not limited to, processor 602 (e.g., any of microprocessors, controllers, and the like), memory 604, input devices 606, output devices 608, and network devices 610.

Computer 600 typically includes a variety of computer-readable media. Such media can be any available media that is accessible by computer 600 and includes both volatile and non-volatile media, removable and non-removable media. Memory 604 includes computer-readable media in the form of volatile memory, such as random access memory (RAM), and/or non-volatile memory, such as read only memory (ROM). A basic input/output system (BIOS), containing the basic routines that help to transfer information between elements within computer 600, such as during start-up, is stored in memory 604. Memory 604 typically contains data and/or program modules that are immediately accessible to and/or presently operated on by processor 602.

Memory 604 can also include other removable/non-removable, volatile/non-volatile computer storage media. By way of example, a hard disk drive may be included for reading from and writing to a non-removable, non-volatile magnetic media; a magnetic disk drive may be included for reading from and writing to a removable, non-volatile magnetic disk (e.g., a "floppy disk"); and an optical disk drive may be included for reading from and/or writing to a removable, non-volatile optical disk such as a CD-ROM, DVD, or any other type of optical media.

The disk drives and their associated computer-readable media provide non-volatile storage of computer-readable instructions, data structures, program modules, and other data for computer 600. It is to be appreciated that other types of computer-readable media which can store data that is accessible by computer 600, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement exemplary computer 600.

Any number of program modules can be stored in memory 604, including by way of example, an operating system 626, application programs 628, and data 632. Each of such operating system 626 and application programs 628 may include an embodiment of the systems and methods for managing frame rates during multimedia playback. As shown in FIG. 6, application programs 628 include multimedia player 100, which includes Synchronizer 135. Data 632 include multimedia data 105.

Computer 600 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computer 600 via input devices 606 such as a keyboard and a pointing device (e.g., a "mouse"). Other input devices 606 may include a microphone, joystick, game pad, controller, satellite dish, serial port, scanner, touch screen, touch pads, key pads, and/or the like. Output devices 608 may include a CRT monitor, LCD screen, speakers, printers, and the like.

Computer 600 may include network devices 610 for connecting to networks, such as local area network (LAN), wide area network (WAN), wireless phone network, and the like.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A computer-implemented method for processing video data comprising:
    determining an ideal playback timing associated with the video data, the ideal playback timing determined at least in part by way of information encoded in the video data; and
    if an actual playback timing of the video data lags the ideal playback timing, the lag resulting from a limited processing power of the computer implementing the method, varying a frame rate associated with the video data using a smoothing function to recover toward the ideal playback timing, wherein smoothly varying the frame rate includes controlling the frame rate using a frame-dropping algorithm that drops frames in the video data in accordance with the smoothing function.

2. The computer-implemented method as recited in claim 1, wherein controlling the frame rate includes:
    computing a delay by comparing the actual playback timing with the ideal playback timing; and
    if the delay exceeds a threshold value, determining that the actual playback timing lags the ideal playback timing.

3. The computer-implemented method as recited in claim 2, wherein the threshold value accounts for ordinary system variations.

4. The computer-implemented method as recited in claim 2, wherein the delay is computed by subtracting the ideal playback timing from the actual playback timing.

5. The computer-implemented method as recited in claim 2, wherein the smoothing function incorporates the delay as a variable.

6. The computer-implemented method as recited in claim 2, wherein the delay is computed as an average delay that includes an average of the delay associated with a current frame of the video data and at least a delay associated with a previous frame.

7. The computer-implemented method as recited in claim 6, wherein the average delay is an average of delays associated with the current frame and a plurality of previous frames.

8. The computer-implemented method as recited in claim 1, wherein the frame-dropping algorithm includes a rasterization algorithm.

9. The computer-implemented method as recited in claim 1, wherein the frame-dropping algorithm includes if a current frame is a B-frame, dropping the current frame.

10. The computer-implemented method as recited in claim 1, wherein the frame-dropping algorithm includes if a current frame is an I-frame, showing the current frame without further determination.

11. The computer-implemented method as recited in claim 1, wherein the frame-dropping algorithm includes if a current frame is a P-frame, processing the current frame to obtain enough information for processing subsequent frames before dropping the current frame.

12. The computer-implemented method as recited in claim 1, wherein the frame-dropping algorithm includes if the actual playback timing does not lag the ideal playback timing, overriding any determination to drop frames.

13. The computer-implemented method as recited in claim 1, wherein the ideal playback timing is determined from a presentation clock.

14. The computer-implemented method as recited in claim 13, wherein the presentation clock includes a filter configured to remove noise.

15. One or more computer-readable memories containing a computer program that is executable by a processor to perform the computer-implemented method recited in claim 1.

16. A computer-implemented method for managing video data frame rates comprising:
    determining delays associated with playback of frames of video data;
    calculating an average delay from averaging the delays;
    determining an ideal frame rate associated with the frames;
    calculating a frame skip factor; and
    varying the frame rates associated with the playback by applying a frame-dropping algorithm configured to determine whether to drop a current frame using the frame skip factor, wherein the frame-dropping algorithm includes:
    if the frame skip factor is greater than the ideal frame rate, adding the ideal frame rate to an iterator; and
    if the iterator is greater than or equal to the frame skip factor, subtracting the frame skip factor from the iterator and showing the current frame.

17. The computer-implemented method as recited in claim 16, wherein the frame skip factor is calculated with a tolerance factor that accounts for variability in a system timer.

18. The computer-implemented method as recited in claim 16, wherein the frame-dropping algorithm includes an iterative algorithm that varies the frame rates using a smoothing function that includes the frame skip factor.

19. The computer-implemented method as recited in claim 16, wherein the frame-dropping algorithm includes if the iterator is less than the frame skip factor, dropping the current frame.

20. The computer-implemented method as recited in claim 19, wherein the frame-dropping algorithm includes:
    if the iterator is less than the frame skip factor, determining whether the average delay has reached a significant percentage of a maximum delay; and if so, showing the next I-frame subsequent to the current frame.

21. The computer-implemented method as recited in claim 16, wherein priority is given to the execution of the computer-implemented method to improve the quality associated with the calculated frame rates.

22. One or more computer-readable memories containing a computer program that is executable by a processor to perform the method recited in claim 16.

23. An apparatus comprising:
means for determining delays associated with playback of frames of video data; means for calculating an average delay from averaging the delays;
means for determining an ideal frame rate associated with the frames;
means for calculating a frame skip factor; and
means for controlling the frame rate using a frame-dropping algorithm that drops frames in the video data in accordance with the skip factor, wherein the frame-dropping algorithm includes:
if the skip factor is greater than the ideal frame rate, adding the ideal frame rate to an iterator; and
if the iterator is greater than or equal to the frame skip factor, subtracting the frame skip factor from the iterator and showing the current frame.

24. The apparatus as recited in claim 23, further comprising means for buffering the video data so that the frame-dropping algorithm is executing ahead of real time.

25. The apparatus as recited in claim 23, further comprising means for incorporating a rasterization algorithm into the frame-dropping algorithm.

26. The apparatus as recited in claim 23, wherein the frame skip factor is calculated with a tolerance factor that accounts for variability in a system timer.

27. The apparatus as recited in claim 23, wherein the frame-dropping algorithm includes an iterative algorithm that varies the frame rates using a smoothing function that includes the frame skip factor.

28. The apparatus as recited in claim 23, wherein the frame-dropping algorithm includes if the iterator is less than the frame skip factor, dropping the current frame.

29. The apparatus as recited in claim 28, wherein the frame-dropping algorithm includes:
if the iterator is less than the frame skip factor, determining whether the average delay has reached a significant percentage of a maximum delay; and
if so, showing the next I-frame subsequent to the current frame.

30. An electronic device comprising:
a memory; and
a processor coupled to the memory, the processor being configured to:
determine delays associated with playback of frames of video data;
calculate an average delay from averaging the delays;
determine an ideal frame rate associated with the frames;
calculate a frame skip factor; and
vary a frame rate associated with the playback by applying a frame-dropping algorithm configured to determine whether to drop a current frame using the frame skip factor, wherein the frame-dropping algorithm includes:
if the frame skip factor is greater than the ideal frame rate, adding the ideal frame rate to an iterator; and
if the iterator is greater than or equal to the frame skip factor, subtracting the frame skip factor from the iterator and showing the current frame.

* * * * *